United States Patent

[11] 3,586,933

[72] Inventor Joseph N. Bonini
 Plainfield, N.J.
[21] Appl. No. 3,011
[22] Filed Jan. 15, 1970
[45] Patented June 22, 1971
[73] Assignee Gulton Industries, Inc.
 Metuchen, N.J.

[54] TRIMMABLE MONOLITHIC CAPACITOR AND METHOD OF MAKING THE SAME
 8 Claims, 5 Drawing Figs.

[52] U.S. Cl. .................................................. 317/261,
 317/242
[51] Int. Cl. .................................................. H01g 3/09
[50] Field of Search ...................................... 317/261,
 242, 249

[56] References Cited
UNITED STATES PATENTS

| | | | |
|---|---|---|---|
| 2,395,442 | 2/1946 | Ballard .......................... | 317/261 X |
| 3,223,905 | 12/1965 | Fabricus ....................... | 317/261 X |
| 3,237,066 | 2/1966 | Martin et al. ................. | 317/261 X |
| 3,391,312 | 7/1968 | Ruffner ......................... | 317/261 X |
| 3,452,257 | 6/1969 | Belko, Jr. ...................... | 317/261 |
| 3,466,513 | 9/1969 | Belko, Jr. et al. ............. | 317/261 |

Primary Examiner—Lewis H. Myers
Assistant Examiner—A. T. Grimley
Attorney—Wallenstein, Spangenberg, Hattis & Strampel ABSTRACT: A trimmable capacitor is formed of a monolithic capacitor body made of a plurality of peripherally fired together layers of insulating material each coated with a conductive material forming a capacitor plate. Preferably, at least one rough trimming adjustment plate is formed by a conductive coating on one of the layers of insulating material and opposite a main plate-forming conductive coating of an adjacent layer of insulating material. Also, a plurality of fine trimming adjustment plate means are formed by spaced-apart conductive coatings on another layer of insulating material opposite a second plate-forming conductive coating on an adjacent layer of insulating material. The rough trimming plate means and each of the fine trimming plate means have edge portions extending to one side of the capacitor body and are selectively connected in circuit with one group of the main capacitor-forming plates incrementally to increase the capacitance value thereof to a desired fixed capacitance value.

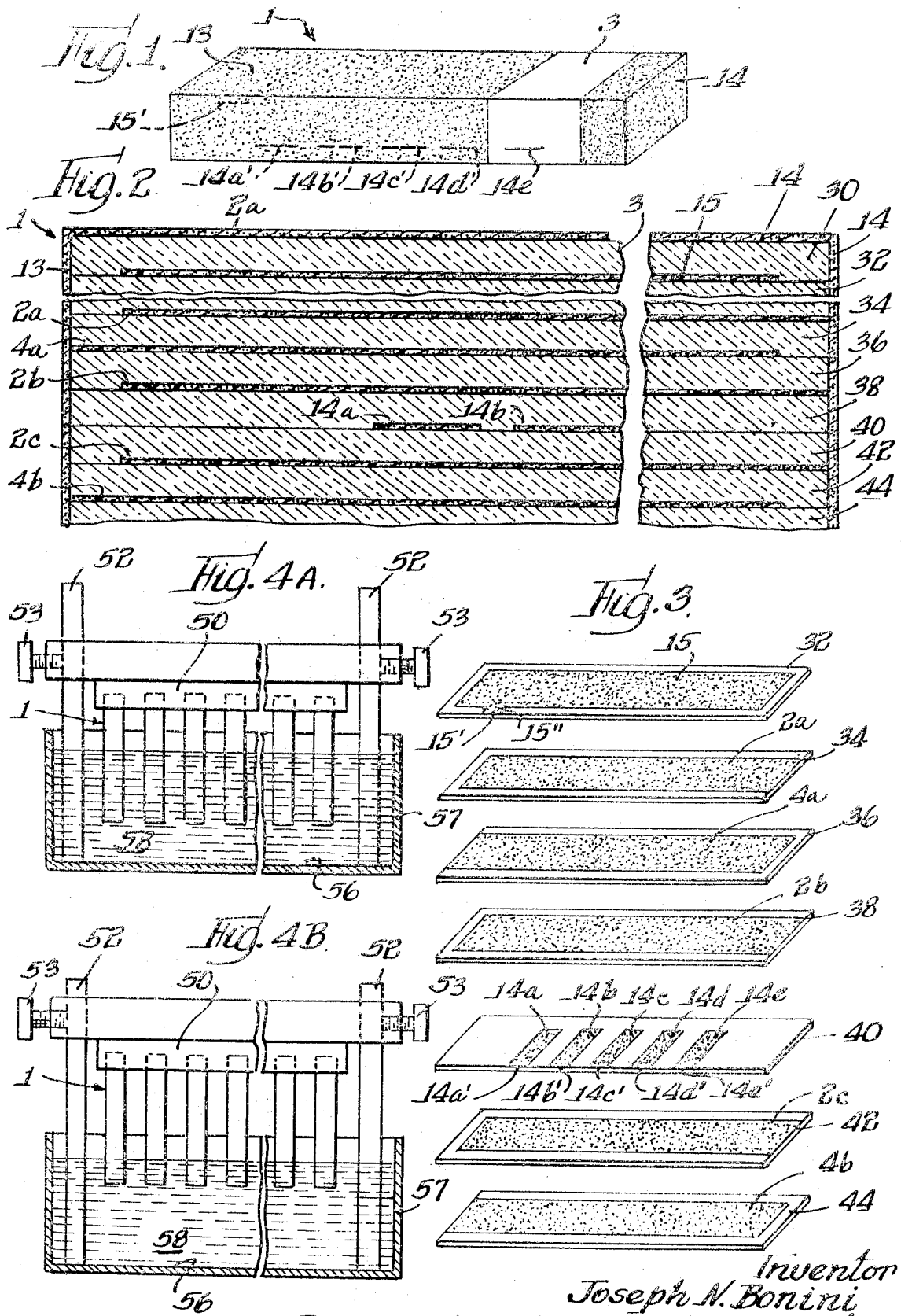

TRIMMABLE MONOLITHIC CAPACITOR AND METHOD OF MAKING THE SAME

This invention relates generally to trimmable capacitors, and more particularly to monolithic capacitor bodies which can be trimmed to an accurate fixed capacitance value during the manufacture thereof, and a method of making the same.

Monolithic ceramic capacitors are well known in the art and the techniques of their manufacture are perfected so that very small capacitors can be formed on a mass production basis. Generally, a plurality of thin sheets or raw ceramic material are provided with selected areas thereof coated with spaced rows and columns of conductive capacitor plate-forming material for a number of capacitors. The raw ceramic sheets are placed one on top of the other so the conductive coatings for each capacitor are in registry. Individual raw ceramic capacitors are cut from the resulting laminate body to form capacitors whose alternate conductive coatings extend to opposite ends thereof and whose ceramic layers are in contact along the lateral margins thereof. The raw ceramic capacitor bodies are then fired at a high temperature to vaporize the binder material of the ceramic layers and to sinter the same to form monolithic capacitors. The ends of the capacitors are coated with a silver paste, either before or after firing, to form a pair of capacitor terminals respectively interconnecting the capacitor plate-forming coatings extending to the opposite ends of the capacitor involved.

The above described ceramic capacitors are readily manufactured within tolerances of, for example, plus or minus 10 percent. In instances where very accurate capacitance values are required, as for example, tolerances of plus or minus 1 percent, a capacitor having a capacitance above the desired size heretofore has been trimmed to the desired size by cutting or sandblasting after it has been fired and the capacitance value thereof determined by actual measurement. The fired capacitor is brittle and cutting or sandblasting the same in many instances damages the same by causing cracking of the ceramic capacitor body. Also, sandblasting causes undesired porosity of the edge surfaces of the capacitor being trimmed, so moisture and contaminants can enter the capacitor to vary the value thereof. In addition, sandblasting a capacitor can spread the exposed edges of the capacitor plates to cause short circuits between adjacent plates in the capacitors and the trimming thereof by cutting or sandblasting requires such a great deal of time and care that the capacitor becomes very expensive to fabricate and trim.

Accordingly an object of the invention is to provide a monolithic ceramic capacitor of the type described which can be trimmed to close tolerances quickly and easily and at low cost.

A more specific object of the invention is to provide a monolithic ceramic capacitor which can be trimmed to a desired value during manufacture thereof without in any way adversely affecting the integrity of or damaging the capacitor in any way.

A related object of the invention is to provide a simple and economical method of trimming the latter monolithic ceramic capacitor, Briefly, in accordance with one aspect of the invention, the monolithic ceramic capacitor is formed with one or more ceramic layers provided with a number of fine trimming plate-forming conductive coatings initially unconnected and of about the same size extending to different points on one or more of the lateral edges thereof. Each of the conductive coatings may be connected to act as a fine trimming capacitor plate by, for example, having an area which is capable of adding a small percent (e.g. one-half of one percent) to the total capacitor plate area. One or more of the ceramic layers may also be provided with an initially unconnected rough trimming plate-forming coating extending to a lateral edge thereof and capable of adding a much greater percentage (e.g. 5 percent) to the total plate area of the capacitor. In the most preferred form of the invention, the various trimming plate-forming coatings extend to different longitudinally spaced points on one or more of the lateral edges of the capacitor which points are also longitudinally spaced from the end portions of the capacitor to be occupied by the end terminals of the finished capacitor. After a large number of capacitors are initially fabricated in their untrimmed state (i.e. with end terminals unconnected to the trimming capacitor plate-forming coatings thereof), their capacitance values are tested after which the capacitors having capacitance values falling short of their desired value by the same respective percentages are separated out into respective groups so that each group of capacitors having capacitance values falling short of the desired value by the same percentage can be trimmed identically on a mass production basis. The capacitors in each group are trimmed to the desired value by extending one of the associated end terminals to cover the proper number of exposed edges of the trimming plate-forming coatings to provide the desired plate area. The end terminal extending operation can be most efficiently accomplished by supporting a large number of capacitors in parallel relation on a common frame and immersing the capacitors to the same degree in a body of terminal forming material such as a body or silver paste, to cover the required number of plate-forming coating edges.

As one example of the invention, if there is a single rough trimming plate of a size to add about 5 percent of capacitance value to the capacitor and 10 fine trimming plates each of a size to add about one-half percent to the capacitance value of the capacitor, then the range of adjustment in capacitance is 0 to 10 percent in one-half percent increments, or one-half to 5 percent in one-half percent increments (if the exposed edge of the rough trimming plate is coated with a film of insulation material before the dipping or other terminal extending operation involved).

The above and other objects, features and advantages of the invention will be more fully realized and understood from the following detailed description when taken in conjunction with the accompanying drawings herein like reference numerals throughout the various views of the drawings are intended to designate similar elements or components. In the drawings:

FIG. 1. is a perspective view of a trimmable monolithic capacitor constructed in accordance with this invention;

FIG. 2 is an enlarged fragmentary sectional view of the capacitor body of FIG. 1;

FIG. 3 is an exploded view of the various capacitor-plate-containing layers shown in FIG. 2; and FIGS. 4A and 4B diagrammatically illustrate a method of applying coatings of conductive paste or the like, to form the terminals on capacitor bodies constructed in accordance with this invention.

Referring now to FIGS. 1, 2, and 3, there is seen a monolithic ceramic capacitor 1 which includes an elongated rectangular ceramic body 3 having a plurality of parallel spaced main capacitor plates 2a, 4a, 2c4b, etc. in the order named embedded therein. The main capacitor plates 2a, 2b, etc. form one group of main capacitor plates encompassing most or the cross section of the ceramic body but spaced from all margins but the right end thereof, as viewed in the drawings, and the main capacitor plates 4a, 4b, etc. form another group of plates encompassing most of the cross section of the ceramic body but spaced from all margins ut the left end thereof. Also embedded within the capacitor body 3 are fine trimming plates 14a, 14b, 14c, 14d and 14e, most advantageously in the same plane of the body, and a rough trimming capacitor plate 15 preferably in another plane of the body, such as a plane near the outer surface of the capacitor body. As illustrated, the fine trimming plates are narrow, spaced, laterally extending plates having edges 14a', 14b', 14c', 14d' and 14e' at one lateral side of the capacitor body 3, and the rough trimming plate 15 encompasses most of the cross section of the capacitor body and is spaced from all margins of the ceramic body 3 except when it extends to a lateral side margin thereof through a narrow tab 15" having an edge 15'. It is most advantageous (although not necessary) that the edges of the fine and rough trimming capacitor plates extend to the same or different lateral sides of the capacitor body at different longitudinally spaced points therealong.

In the finished capacitor shown in FIG. 1, a terminal-forming coating 13 extending over and around the left side portion of the capacitor body 3 interconnects the various edges of the main capacitor plates 4a, 4b, etc. extending to the left end of the capacitor body 3 and extends longitudinally along the capacitor body a sufficient distance to overlie a preselected number of the edges of the fine and rough trimming capacitor plates to trim the capacitor to the desired value. In FIG. 1 the terminal-forming coating 13 extends over the edge 15 of the tab 15'' of the rough trimming plate 15 and the edges 14a', 14b', 14c' and 14d' of the fine trimming plates 14a, 14b, 14c, 14d, leaving exposed and unconnected the edge 14e' of the fine trimming plate 14e. The edges of the group of main capacitor plates 2a, 2b, etc. extending to the right end of the capacitor body 3 are interconnected and covered by a narrow terminal-forming coating 14 which is spaced and insulated from the first-mentioned terminal-forming coating 13.

The ceramic body 3 most advantageously comprises a plurality of sintered together ceramic layers of a suitable dielectric-forming material such as barium titanate. As seen in FIGS. 2 and 3, the ceramic layers shown therein include layers 30, 32, 34, 36, 38, 40, 42, 44, etc. The rough trimming plate 15 is a deposited coating of conductive material like platinum on the second ceramic layer 32. The fine trimming plates 14a, 14b, 14c, 14d, and 14e are shown as relatively narrow deposits of conductive material on one of the intermediate ceramic layers 40, each of the deposits or coatings occupying a small fraction of the length of the layer involved and extending to the same lateral margin of the layer 40 to form the aforesaid edges 14a', 14b', 14c', 14d' and 14e' of the fine trimming plates. As illustrated, the edge 15' of the rough trimming plate 15 occupies a different longitudinal segment of the capacitor body 3 than the edges 14a', 14b', 14c', 14d' and 14e' of the fine trimming plates.

The group of main capacitor plates 4a, 4b, etc. extending to the left end of the ceramic body 3 are deposits of conductive material on various ceramic layers 36, 44, etc. Similarly, the other group of main capacitor plates 2a, 2b, 2c, etc. are deposits of conductive material on ceramic layers 34, 38, 42, etc. Upper and lower layers of ceramic material (only the uppermost ceramic layer 30 being visible in FIGS. 2 and 3) respectively overlie and underlie the uppermost and lowermost coated ceramic layers.

As is conventional in the manufacture of monolithic ceramic capacitors, the various conductive coatings are initially applied on large raw ceramic sheets of ceramic material by squeegeeing a slurry of conductive material thereon through a silk screen or other mask, each sheet containing coatings for a number of different capacitors. These coated sheets are then dried and stacked to form a large laminate body from which individual raw ceramic capacitor bodies are cut, with the edge portions of the various coatings extending to various edges of the resulting capacitor bodies. Before the terminal-forming coating 13 is thus applied or extended to cover the edges of the trimming plates, the capacitance values of the various capacitor bodies involved are measured using conventional capacitor measuring techniques and apparatus to determined the untrimmed values of the various capacitors.

After such measurement the capacitor bodies are separated into various groups where the capacitor bodies in each group have a capacitance value less than the desired rated capacitance value by roughly the same percentage, so that the capacitor bodies in each group can be similarly trimmed utilizing the present invention on a mass production basis by applying and/or extending the terminal-forming coating to overlie and connect the proper number of trimming plates. Although, the terminal-forming coatings 13 could be hand painted on the capacitor bodies one at a time, it is best done on a mass production basis in a manner like that shown in FIGS. 4A or 4B.

It will be assumed that the rough trimming plate can add 5 percent and each fine trimming plate 14a, 14b, 14c, etc. can add one-half percent to the capacitance of each untrimmed capacitor body. Thus, for example, if the capacitors in a given group differ from the desired value by a percentage of, for example 7 percent, rough trimming plate 15 and fine trimming plates 14a, 14b, 14c and 14d must be connected to the terminal forming coating 13. The capacitors 1 may be supported in a depending position from a suitable clamping frame 50 with the ends thereof to contain the terminal-forming coatings 13 at the bottom of the capacitors and in the same horizontal plane. The clamping frame 50 illustrated is supported for vertical adjustment along a pair of vertical bars 52-52 by loosening and then tightening clamping screws 53-53. The bars 52-52 are adapted to rest on the bottom 56 of an open-top tray 57 containing a body 58 of terminal-forming material, such as a slurry of silver or the like. The spacing of the common plane at the bottom of the various capacitors 1 supported from the clamping frame 50 and the bottom of the bars 52-52 is such that when the bars 52-52 are placed on the bottom of the tray 58, the body of silver 58 or the like will cover over the edges 15' of the rough trimming plates 15 and a number of the edges 14a, 14b', etc. of the fine trimming plate to raise the capacitive value to the desired amount. Thus, in the example being described where it is desired to increase the capacitance value by 7 percent, the spacing referred to is such that placing the bars 52-52 on the bottom of the tray 56 will cause the trimming plate edges 15', 14a', 14b', 14c' and 14d' to be coated with silver, thereby electrically connecting the trimming plates involved to the various main capacitor plates extending to the end of the capacitor body containing the terminal-forming coating 13.

FIG. 4B illustrates an adjustment of the clamping frame 50 on the bar 52-52 which, when the rods are placed on the bottom of the tray, will cover the edges 15' of the rough trim plate 15 and the edge 14a' of the fine trim plate 14a to add 5½ percent capacitance to the various capacitors 1 shown.

The illustrated embodiment of the invention thus provides readily trimmable monolithic ceramic capacitor bodies and a method of trimming the same wherein small increments of capacitance can be easily added on a mass production basis to the capacitor bodies without causing defects therein, and wherein the trimming adjustments can be made quickly and easily with a minimum of expense and time.

It will be understood that variations and modifications of this invention may be made without departing from the spirit and scope of the novel concepts disclosed and claimed herein.

I claim:

1. A trimmable monolithic ceramic capacitor having layers of ceramic material with capacitor plate-forming conductive coatings thereon and fixed to form a monolithic capacitor body, said capacitor plate-forming conductive coatings of the various layers of ceramic material forming a first group of capacitor plates extending to one end of said capacitor body and a second group of capacitor plates interleaved with said first group of capacitor plates and extending to the other end of said capacitor body, and said capacitor body having at least one layer of ceramic material with at least one trimming plate-forming conductive coating terminating short of the end of the capacitor body and extending to a side edge thereof, said trimming plate-forming conductive coating being opposite at least one capacitor plate extending to one end of said capacitor body, a first capacitor terminal-forming conductive coating on said one end of said capacitor body and overlying and electrically interconnecting the portions of the first group of capacitor plates extending thereto and a second capacitor terminal-forming conductive coating on the other end of said capacitor body and overlying and electrically interconnecting the portions of the second group of capacitor plates extending thereto and also overlying the portion of said trimming plate-forming conductive coating extending to the side edge of the capacitor body.

2. The trimmable monolithic ceramic capacitor of claim 1 wherein said one layer of ceramic material has a number of longitudinally spaced fine trimming capacitor plate-forming conductive coatings each extending to a different point on the side edge of said capacitor body, and said second capacitor terminal-forming conductive coating overlying the edges of a number of said trimming plate-forming conductive coatings necessary to provide a capacitor of the desired capacitance value.

3. A trimmable capacitor comprising a body of dielectric material having interleaving main capacitor plates having edges exposed at the opposite ends of the dielectric body, and a plurality of individual fine trimming plates within said dielectric body and each being opposite at least one main capacitor plate having an edge exposed at one of the ends of the dielectric body, said fine trimming plates having edges exposed at different points on the side of the dielectric body, a first capacitor terminal at one end of said dielectric body overlying and electrically interconnecting said exposed edges of the main capacitor plates thereat, a second capacitor terminal at the other end of said dielectric body overlying and electrically interconnecting the said exposed edges of the main capacitor plates thereat and also overlying and interconnecting said exposed edges of less than all of said fine trimming plates at the side of the dielectric body.

4. The trimmable capacitor of claim 3 wherein each of said fine trimming capacitor plates has a similar area which is a small fraction of the corresponding cross-sectional area of the dielectric body, each trimming plate extends to a different longitudinal point of the side of the capacitor, and said capacitor terminals are conductive coatings on the ends of the dielectric body one of which extends longitudinally to cover said exposed edges of a number of trimming capacitor plates necessary to provide a capacitance of desired value.

5. A trimmable capacitor comprising a dielectric body having a first group of main capacitor plates having exposed edges at one area of said capacitor body to form a first terminal receiving area for interconnecting the plates of said first group and a second group of main capacitor plates interleaved with said first group of plates and having exposed edges at another area of said capacitor body to form a second terminal receiving area for interconnecting the plates of said second group of plates, and a number of similar fine trimming plates within said capacitor body each opposite at least one of the main capacitor plates for increasing the capacitance of the capacitor in similar small increments, said fine trimming plates being unconnected and having edges thereof exposed at different points on the dielectric body to be selectively connected with the exposed edges of one of said groups of plates to increase the capacitance value of the capacitor body to a desired accurate value.

6. The trimmable capacitor of claim 5 wherein said dielectric body is rectangular in configuration, and said first terminal-receiving area is formed at one end thereof and said second terminal-receiving area is formed at the other end thereof, and said trimming plates being exposed at the side of the dielectric body.

7. The trimmable capacitor of claim 5 having a first terminal on said capacitor body at said first terminal-receiving area and overlying and electrically interconnecting said exposed edges of said first group of plates and extending to the exposed edges of selected ones of said trimming plates, and a second terminal on said capacitor body at said second terminal-receiving area where it overlies and electrically interconnects said exposed edges of said second group of plates.

8. The trimmable capacitor of claim 5 wherein said fine trimming plates are located in the same plane and each has an area much less than the area of any one of the main capacitor-forming plates within said dielectric body and edge portions thereof exposed selectively to be connected with said first group of plates to increase the capacitance value of said capacitor in discrete increments.